Patented May 7, 1929.

1,711,860

UNITED STATES PATENT OFFICE.

ROBERT SCHMIDLIN, OF HOCHST-ON-THE-MAIN, GERMANY, ASSIGNOR, BY MESNE ASSIGNMENTS, TO GRASSELLI DYESTUFF CORPORATION, OF NEW YORK, N Y., A CORPORATION OF DELAWARE.

BROWN DYESTUFFS SUITABLE FOR DYEING WOOL AND LEATHER AND PROCESS OF MAKING SAME.

No Drawing. Application filed July 3, 1924, Serial No. 724,130, and in Germany July 23, 1923.

I have found that quinone derivatives of the type:

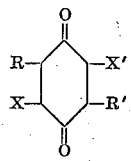

wherein R and R' represent radicles of the products obtained by the condensation of chloronitroaryl sulfonic and carboxylic acids with one amino group of an aromatic diamine which may be substituted, and X and X' represent hydrogen or a univalent substituent, constitute dyestuffs which dye wool and particularly leather (chrome leather) the most varied shades and possess excellent properties in regard to their fastness. The condensation of benzoquinones with the said bodies may occur within wide limits as regards temperature and concentration.

One representative of this class of dyestuffs is for instance the body of the formula:

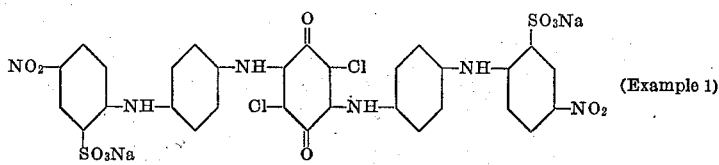 (Example 1)

which gives an excellent deep brown shade. By enlarging the molecule, modified shades can be obtained. Thus, it is possible to obtain for instance by the dyestuff of the formula:

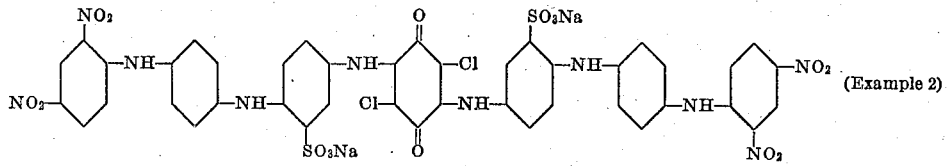 (Example 2)

a brown tint with a green hue which could hitherto be obtained only by a mixture of different dyestuffs.

In view of the accumulation of anilido groups in the molecule it could not be presumed that bodies of sufficient solubility would be produced and having regard to the many electronegative constituents one could not expect that these dyestuffs would be fast to alkalis, a property which they possess in a high degree.

The following examples illustrate my invention:

(1) 31 parts of 4-nitro-4'-aminodiphenylamin-2-sulfonic acid are dissolved in 400 parts of water by means of 10,6 parts of carbonate of sodium and heated for some hours to about 90° C., while stirring, with 12 parts of chloranil. After cooling, the solution is filtered off and then washed. The dyestuff forms a dark-brown powder which, when dissolved in concentrated sulfuric acid and heated, gives a blue solution which dyes wool and leather brown shades.

The product has the probable formula:

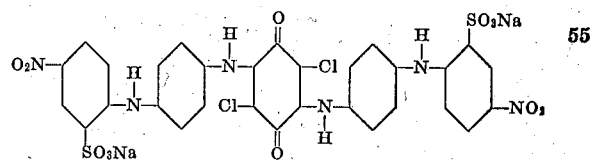

(2) 46,7 parts of sodium aminoanilinodinitrodiphenylamino-sulfonate (obtained by condensation of chlorodinitrobenzene-(1, 2, 4) with sodium 4, 4'-diaminodiphenylamin-2-sulfonate) are dissolved in 400 parts of water and this solution is stirred for some hours at about 90° C. with 12 parts of chloranil and 5,3 parts of sodium carbonate. After filtering and drying, the dyestuff is obtained in the form of a black powder which, when dissolved in conc. sulfuric acid, gives a greenish-yellow solution which dyes leather with a dark-brown shade.

The product has the probable formula:

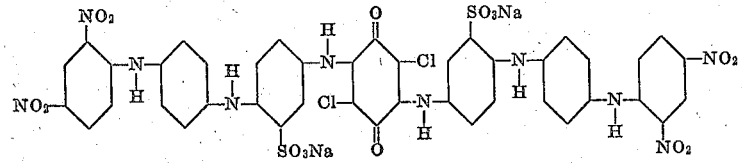

(3) 81 parts of the body of the formula:

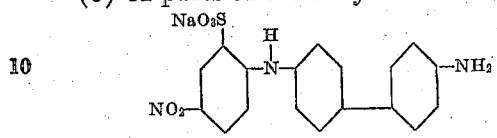

and 42 parts of toluquinone are introduced and stirred for some hours at 90° C. in 3000 parts of water and then salted out. The dyestuff after being pressed out and dried, dyes leather tobacco-brown shades.

The product has the probable formula:

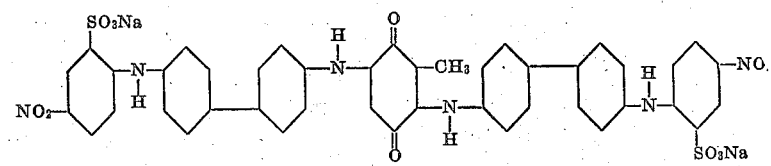

(4) 21 parts of the body of the formula:

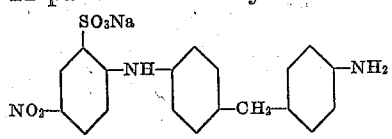

and 9 parts of toluquinone are dissolved in 200 parts of water and stirred for one hour at 90° C. The dyestuff after being salted out and dried, dyes leather olive-brown shades.

The product has the probable formula:

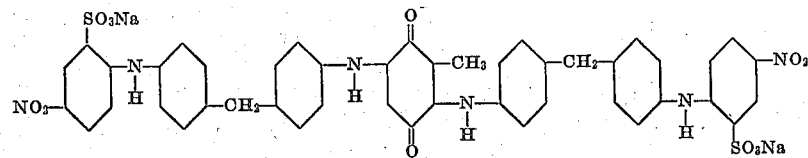

(5) 32,3 parts of 5-methyl-4-amino-4'-nitrodiphenylamine-2'-sulfonic acid are dissolved with 5,3 parts of sodium carbonate in 350 parts of water, there are then added 18 parts of toluquinone and after heating on the water-bath for 2 hours the dyestuff is salted out and dried. It forms a dark-brown powder dissolving in conc. sulfuric acid to a brown solution which only changes slightly when heated and which gives on leather and wool a greenish brown tint.

The product has the probable formula:

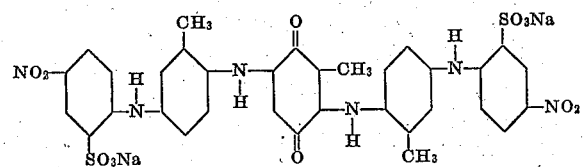

(6) 8,6 parts of (5-amino-1-naphthyl)-4,6-dinitroaniline-2-sulfonate of sodium are mixed and stirred with 4,2 parts of toluquinone in 100 parts of water at 90° C. for 2 hours; the mixture is then filtered and the filtrate precipitated by adding common salt. In a dry state the dyestuff forms a black powder which dissolves in conc. sulfuric acid to a brown solution which gives on chrome leather a greenish-brown tint.

The product has the probable formula:

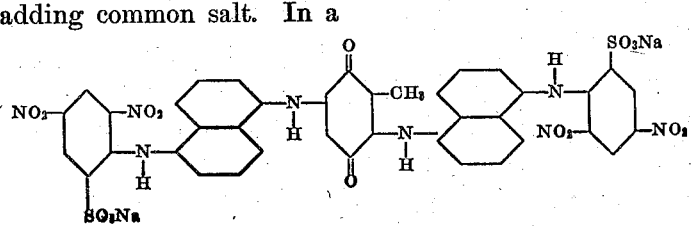

(7) 36 parts of sodium-4-amino-5-methyl-4′ 6′-dinitrodiphenylamine-2′-carboxylate are dissolved, while hot, in 300 parts of water; there are then added 20 parts of toluquinone and the mixture is stirred for one hour at 90° C. A portion of the dyestuff thus formed separates, the remainder is salted out. The dyestuff after being isolated from the lye forms, when dry, a black powder which dissolves in conc. sulfuric acid with a greyish-green coloration and which dyes chrome leather a brown tint with a green hue.

The product has the probable formula:

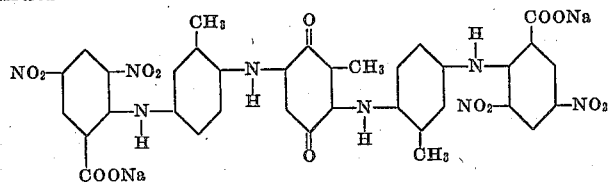

Having now described my invention what I claim is:

1. As new products, compounds of the general formula:

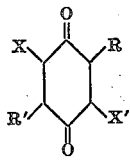

wherein X and X′ represent hydrogen or a monovalent substituent, and R and R′ represent radicles of a compound obtainable by the condensation of a chloronitroaryl compound, containing an acid residue of the group comprising —SO$_3$H and —COOH, with one amino group of an aromatic diamine, which compounds are soluble in water, soluble in sulfuric acid with a characteristic coloration and, in a dry form, are dark-brown to black powders.

2. As new products, compounds of the general formula:

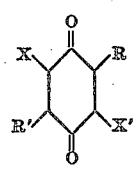

wherein X and X′ represent hydrogen or a monovalent substituent, and R and R′ represent radicles of a compound obtainable by the condensation of 1-chloro-4-nitrobenzene-2-sulfonic acid with one amino group of an aromatic diamine, which compounds are soluble in water, soluble in sulfuric acid with a characteristic coloration and, in a dry form, are dark-brown to black powders.

3. As a new product, the dyestuff of the composition represented by the formula:

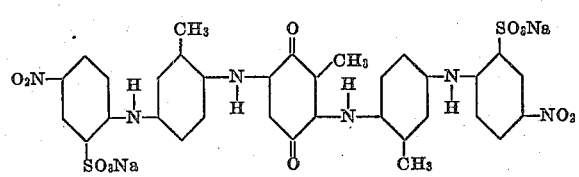

being, in the dry form, a dark brown powder soluble in water with a brown color, soluble in concentrated sulfuric acid with a brown color, and dyeing wool and leather brown tints.

4. A process of making dyestuffs suitable for dyeing wool and leather which comprises condensing a benzoquinone compound with a condensation product of the general formula:

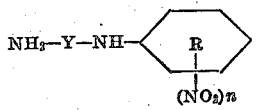

in which Y represents an aromatic residue and $n$ represents a whole number not more than 2, and in which either Y or R contains an acid residue of the group comprising —SO$_3$H and —COOH.

In testimony whereof, I affix my signature.

ROBERT SCHMIDLIN.